(12) United States Patent
Nader

(10) Patent No.: US 9,094,937 B2
(45) Date of Patent: Jul. 28, 2015

(54) SERVING CELL RESELECTION METHODS AND APPARATUS

(75) Inventor: Ali Nader, Malmö (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 713 days.

(21) Appl. No.: 12/548,164

(22) Filed: Aug. 26, 2009

(65) Prior Publication Data

US 2011/0053566 A1   Mar. 3, 2011

(51) Int. Cl.
*H04M 3/42* (2006.01)
*H04W 72/00* (2009.01)

(52) U.S. Cl.
CPC .................................. *H04W 72/005* (2013.01)

(58) Field of Classification Search
CPC ....... H04M 3/42; H04W 36/00; H04W 24/00; H04W 36/04; H04W 36/32; H04W 36/36; H04W 36/30; H04W 36/18; H04W 84/02; H04W 72/04; H04H 20/71; H04J 11/00; H04J 3/00; H04Q 7/20; H04Q 7/38; H04B 17/00; H04L 29/08108; H04L 27/2647; H04L 27/148
USPC ............. 455/414.1, 436, 424, 437, 441, 3.03, 455/450, 452.1, 452.2, 67.11; 370/337; 375/260
See application file for complete search history.

(56) References Cited

U.S. PATENT DOCUMENTS

| | | | |
|---|---|---|---|
| 5,930,710 A | 7/1999 | Sawyer et al. | |
| 6,751,460 B2 | 6/2004 | Korpela et al. | |
| 6,978,142 B2 | 12/2005 | Jokimies | |
| 7,110,765 B2 | 9/2006 | Amerga et al. | |
| 7,127,253 B2 | 10/2006 | Chen | |
| 7,299,045 B2 | 11/2007 | Hsu et al. | |
| 7,395,079 B2 | 7/2008 | Malm | |
| 7,428,416 B2 | 9/2008 | Whinnett et al. | |
| 2002/0068581 A1* | 6/2002 | Salonaho | 455/456 |
| 2006/0058034 A1* | 3/2006 | Vaittinen et al. | 455/450 |
| 2006/0258386 A1 | 11/2006 | Jeong et al. | |
| 2008/0031368 A1 | 2/2008 | Lindoff et al. | |
| 2008/0220784 A1 | 9/2008 | Somasundaram et al. | |
| 2008/0227453 A1 | 9/2008 | Somasundaram et al. | |
| 2009/0059871 A1 | 3/2009 | Nader et al. | |
| 2009/0117905 A1* | 5/2009 | Watanabe et al. | 455/437 |
| 2009/0286468 A1* | 11/2009 | Kim et al. | 455/3.03 |
| 2010/0216454 A1* | 8/2010 | Ishida et al. | 455/424 |
| 2010/0234034 A1* | 9/2010 | Aoyama et al. | 455/450 |

FOREIGN PATENT DOCUMENTS

EP      1850616 A1   10/2007

OTHER PUBLICATIONS

EPO, Int'l Search Report in PCT/EP2010/061779, Dec. 14, 2010.
(Continued)

*Primary Examiner* — Charles Appiah
*Assistant Examiner* — Alexander Yi
(74) *Attorney, Agent, or Firm* — Patent Portfolio Builders PLLC

(57) ABSTRACT

After a user equipment (UE) in a communication network selects a serving cell for multimedia broadcast and multicast service (MBMS), the UE waits an average time before it can re-select a new MBMS serving cell. The average time is based on keeping track of average MCCH reading time, which varies among network operators. In other words, the UE uses time hysteresis but adapts the value of the time hysteresis to the way an operator has deployed its MBMS functionality.

7 Claims, 3 Drawing Sheets

(56) References Cited

OTHER PUBLICATIONS

EPO, Written Opinion in PCT/EP2010/061779, Dec. 14, 2010.
EPO, Int'l Prelim. Report on Patentability in PCT/EP2010/061779, Dec. 14, 2010.
Nokia et al., Text Proposal for Mobility Requirements for UTRA to E-UTRA, R4-080773, Mar. 31, 2008, 3GPP TSG-RAN WG4 Meeting 46bis, Shenzin, CN.
3GPP Tech. Spec. 23.246 ver. 6.12.0, Multimedia Broadcast/Multicast Service (MBMS); Architecture and Functional Description (Release 6) (Jun. 2007).
3GPP TS 25.304 V6.10.0, UE Procedures in Idle Mode and Procedures for Cell Reselection in Connected Mode (Release 6) (Mar. 2008), Sections 5.2 and 5.4.

* cited by examiner

SERVING CELL RESELECTION METHODS AND APPARATUS

BACKGROUND

This invention relates to electronic communication systems and more particularly to communication devices in mobile radio communication systems.

Digital communication systems include time-division multiple access (TDMA) systems, such as cellular radio telephone systems that comply with the GSM telecommunication standard and its enhancements like GSM/EDGE, and code-division multiple access (CDMA) systems, such as cellular radio telephone systems that comply with the IS-95, cdma2000, and wideband CDMA (WCDMA) telecommunication standards. Third generation (3G) mobile radio communication systems, such as the universal mobile telecommunications system (UMTS), are digital communication systems that are standardized by the Third Generation Partnership Project (3GPP). The UMTS employs WCDMA for the air interfaces between user equipments (UEs) and NodeBs, or base stations, in the system. This application focuses on a UMTS system for economy of explanation, but it will be understood that the principles described in this application can be implemented in other digital communication systems.

FIG. 1 depicts a mobile radio communication system 100, which may be, for example, a UMTS. Radio network controllers (RNCs) 110, 112, 114 control various radio network functions, including for example radio access bearer setup, diversity handover, etc., for communicating with UEs. More generally, each RNC directs calls from a UE, such as a mobile phone, via one or more appropriate NodeBs 120, 122, 124, which communicate with each other through downlink (i.e., NodeB-to-UE or forward) and uplink (i.e., UE-to-NodeB or reverse) channels.

In FIG. 1, each RNC 110, 112, 114 is shown coupled to a respective NodeB 120, 122, 124, but this is not necessary; in general, an RNC can be coupled to plural NodeBs. The NodeBs are coupled to their corresponding RNCs by dedicated telephone lines, optical fiber links, microwave links, etc. Each NodeB serves a respective geographical area that can be divided into one or more cell(s). FIG. 1 depicts NodeB 120 serving a Cell A, NodeB 122 serving a Cell B, and NodeB 124 serving a Cell C, with the cells non-overlapping, but this is also not necessary.

In general, the RNCs are connected with external networks such as the public switched telephone network (PSTN), the Internet, etc. through one or more core network nodes like a mobile switching center and/or a general packet radio service (GPRS) node. In FIG. 1, the RNC 110 is shown connected to a Serving GPRS Support Node (SGSN) 130, and the RNCs 112, 114 are connected to an SGSN 132. The SGSNs 130, 132 are connected to Gateway GPRS Support Node (GGSN) 140.

A multimedia broadcast and multicast service (MBMS) for the frequency division duplex (FDD) aspect of a UMTS is standardized by 3GPP. MBMS is described in, for example, 3GPP Technical Specification (TS) 23.246 ver. 6.12.0, Multimedia Broadcast/Multicast Service (MBMS); Architecture and Functional Description (Release 6) (June 2007), among other places. MBMS provides both point-to-point (PTP) and point-to-multipoint (PTM) multimedia services. In PTM, the same data (e.g., text, audio, pictures, video) is transmitted from a single source to multiple receivers.

In the example of a network topology depicted in FIG. 1, a Broadcast/Multicast Service Center (BM-SC) 150 serves as entry point for MBMS services. Streams of data for the various services from the BM-SC 150 go through the GGSN 140 and SGSNs 130, 132 to the RNCs 110, 112, 114. Each RNC decides whether a service is to be broadcast to multiple UEs in a cell (PTM) or sent to one or a small number of UEs (PTP) in a cell based on either a static configuration or on the number of UEs interested in the service. The number can be derived by a procedure called counting. FIG. 1 depicts Service X being broadcast by NodeB 120 to multiple UEs in Cell A, Services X and Y being sent by the NodeB 122 to respective UEs in Cell B, and Service Y being sent by the NodeB 124 to a UE in Cell C.

MBMS enables high-speed and high-quality broadcast, or multicast, transmission to UEs. To enhance the quality and bit rate of MBMS transmission, multicast on Layer 1 is used, i.e., a UE should be able to receive multiple replicas of the same bitstream from different NodeBs. UEs also should be able to receive bitstreams of 128 kilobits per second (kbps) and 256 kbps and to do selective combining on the radio link control (RLC) level (Layer 2). Thus, a UE separately processes different bitstreams on Layer 1, and the UE's RLC entity selects transport blocks, called RLC protocol data units (PDUs), from the different streams based on whether they pass a cyclic redundancy check (CRC) or not. Instead of using RLC PDUs, selective combining and soft combining can also be carried out between multiple antennas, polarization angles, etc. Soft combining is typically performed on Layer 1.

In an MBMS-enabled UMTS, a NodeB broadcasts control information, such as what services are currently available, in which mode (PTM or PTP) a service is available, and other configuration information, on a logical channel called a multicast control channel (MCCH). The same MCCH information is repeated during each of successive repetition periods within each of successive modification periods, and actual user data is carried on a logical channel called an MBMS traffic channel (MTCH).

FIG. 2 depicts two successive modification periods of an MCCH broadcast by a NodeB, with time on the horizontal axis in the figure. As described above, the same MCCH content is repeated in each of the repetition periods during a modification period. It will be understood that FIG. 2 shows only an example of the particular numbers of repetition periods within a modification period.

It is important to note that although a UE can simultaneously read data from several cells (i.e., a UE can simultaneously receive several MTCHs carrying the same data and combine the received streams), the MCCH is cell-specific and so a UE can read only one MCCH at a time. In this application, the cell having an MCCH that the UE has chosen to read is called the UE's "MBMS serving cell".

Choosing an MBMS serving cell while complying with applicable 3GPP specifications is reasonably straightforward for non-dedicated UE states, i.e., IDLE, CELL_PCH, URA_PCH, and CELL_FACH. For example, the UE can simply choose as its MBMS serving cell the cell on which the UE camps in non-dedicated UE states. That camped-on cell is the UE's "serving cell", and procedures for selecting and re-selecting the serving cell are defined in, for example, Sections 5.2 and 5.4 of 3GPP TS 25.304 V6.10.0, UE Procedures in Idle Mode and Procedures for Cell Reselection in Connected Mode (Release 6) (March 2008) and described in U.S. Patent Application Publication No. US 2008/0031368 A1 by Lindoff et al. for "Efficient Cell Selection". Such procedures include both time and signal-quality hysteresis to avoid problems of "ping-ponging" between serving cells, as described for example in U.S. Patent Application Publication No. US 2009/0059871 A1 by Nader et al. for "Time-to-Trigger Handling Methods and Apparatus".

PTP MBMS as well as voice/data calls and other communications use the dedicated UE state CELL_DCH rather than a non-dedicated state like IDLE. In the CELL_DCH state, the UE is connected to a set of plural cells that is called the Active Set, and so a UE does not have a typical serving cell in its CELL_DCH state. Thus, choosing an MBMS serving cell in the CELL_DCH state is not straightforward and there is a need for a method for choosing an MBMS serving cell in a stable way, which is to say, without ping-ponging and other problems. It will be appreciated that this problem arises from the UE's need to read a cell-specific MCCH; the UE can combine MTCHs from several cells just as it does with signals from the Active Set for normal non-MBMS activity.

SUMMARY

In an aspect of the invention, there is provided a method in a user equipment (UE) of determining an average time for changing a multimedia broadcast and multicast service (MBMS) serving cell. The method includes collecting information, based on a signal received by the UE, that is needed for determining the average time for changing an MBMS serving cell of the UE; and based on collected information, computing a value of the average time for changing the UE's MBMS serving cell.

In an aspect of the invention, there is provided an apparatus in a UE for determining an average time for changing a MBMS serving cell. The apparatus includes a processor configured to collect information, based on a signal received by the UE, that is needed for determining the average time for changing an MBMS serving cell of the UE; and a control unit configured to compute, based on collected information, a value of the average time for changing the UE's MBMS serving cell.

In an aspect of the invention, there is provided a computer-readable medium encoded with a computer program for determining an average time for changing a MBMS serving cell in a UE. The computer program when executed causes the computer to perform a method including collecting information, based on a signal received by the UE, that is needed for determining the average time for changing an MBMS serving cell of the UE; and based on collected information, computing a value of the average time for changing the UE's MBMS serving cell.

BRIEF DESCRIPTION OF THE DRAWINGS

The several objects, features, and advantages of Applicant's invention will be understood by reading this description in conjunction with the drawings, in which.

DETAILED DESCRIPTION

The inventor has recognized the advantages of keeping track of average MCCH reading time for respective operators. After a UE chooses a new MBMS-capable cell, the UE waits the appropriate average time before it re-selects a new cell. In other words, the UE uses time hysteresis but adapts the value of the time hysteresis to the way an operator has deployed its MBMS functionality.

It will be understood that to facilitate the description of the invention, the system described is a UMTS, or WCDMA system, employing MBMS, but this is merely exemplary and the invention can be implemented in other communication systems with other services. In addition, it will be understood that although problems are most evident in the UE dedicated state CELL_DCH as described above, the invention can be implemented in UE non-dedicated and other dedicated states as well.

The inventor has recognized that one way for a UE to choose an MBMS serving cell in a stable way is to include a predetermined time hysteresis in CELL_DCH. In other words, after a UE selects (or reselects) an MBMS serving cell, the UE remains there for at least a predetermined time period before reselecting another MBMS serving cell. In this "simple" way, the UE has enough time to capture MCCH data before reselecting to another cell.

Nevertheless, the simple way is not as efficient as it could be. Predetermined time hysteresis requires tuning (i.e., a trade-off) of the timer value: the smaller the hysteresis value is, the larger the risk of missing MCCH information in the new cell is; and the larger the hysteresis value is, the larger the period needed for the UE to reselect to a new cell and get up-to-date control data is. The latter is particularly important for a UE in a train or other fast-moving environment, which is expected to be a common place where a user would access mobile TV or other MBMS services. Moreover, a UE does not know the lengths of the modification and repetition periods in an MCCH beforehand and those lengths can vary from network operator to network operator and even from cell to cell within a network. Short hysteresis values have other problems, such as producing unnecessary activities per cell change that affect UE processing load, resource conflicts, etc.

Figure 3:
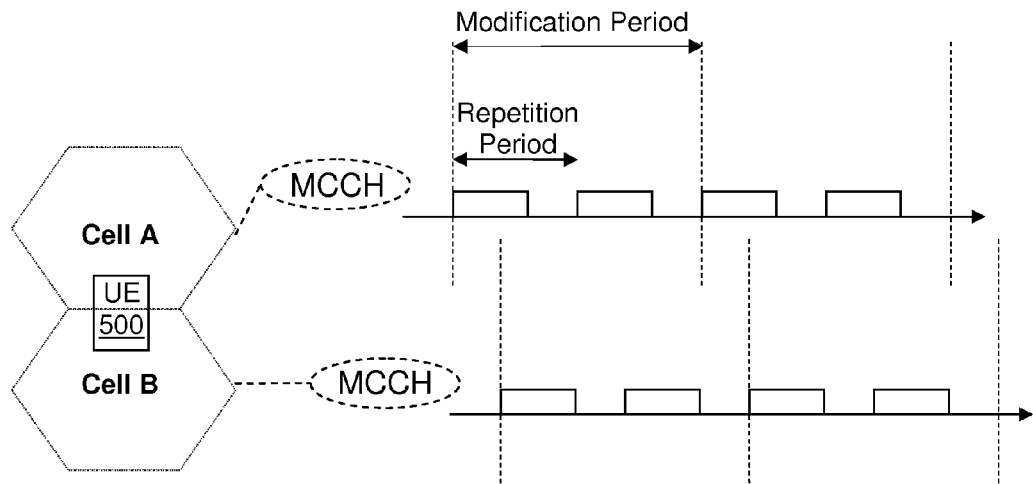
FIG. 3 depicts timings of multicast control channels in different cells.

FIG. 3 depicts MCCH timings in different cells and helps illustrate a better way for a UE to choose an MBMS serving cell. In FIG. 3, a UE 500 is shown on the border between Cell A and Cell B, each of which broadcasts MBMS control information on its respective MCCH. In the example of FIG. 3, the MCCHs of the two cells are not temporally aligned, although it is assumed that the modification and repetition periods are the same. It is currently believed that this arrangement of MCCHs in FIG. 3 is likely for all cells in a given operator's network.

Assuming a uniform distribution of the random MCCH timing difference between cells, the inventor has recognized that a UE on average selects a new MBMS serving cell in the middle of a repetition period of the selected cell's MCCH. Moreover, the inventor has also recognized that an MBMS serving cell change takes, on average, an amount of time that is the sum of two parameters: the average idle period between MCCH information bursts, and the average MCCH reading time. The average MCCH reading time is the average time needed by the UE to read an MCCH information burst and to read system broadcast information necessary for MBMS operation, e.g., the Master Information Block (MIB), System Information Block Type 5 (SIB5), SIB Type 11 (SIB11), and possibly Scheduling Block 1 (SB1) and SIB2, if used by the network operator.

After a UE selects a new MBMS serving cell, the UE waits for at least the average MBMS serving cell change time before re-selecting an MBMS serving cell. By waiting, the UE gives information broadcast by the selected cell a chance to be processed. The idle period between MCCH information bursts and the MCCH reading time are preferably measured by the UE and used to compute a moving average of the MBMS serving cell change time as the UE moves from cell to cell through an MBMS network. The moving average MBMS serving cell change time can advantageously be weighted toward the most recent reading time and the most recent idle period.

It will be understood that during an initialization phase in which the UE has not yet determined an average MBMS serving cell change time based on measured idle periods between MCCH information burst and measured MCCH reading times, the UE can use a predetermined value as the average MBMS serving cell change time until the UE can determine a suitable average MBMS serving cell change time. In principle, substantially any value greater than zero can be used as the predetermined value.

It will be understood that determining an average MBMS serving cell change time as described above can be considered a time hysteresis in the process of MBMS serving cell selection and reselection. One difference between the time hysteresis described in this application and the conventional time hysteresis (e.g., Treselection) and event triggering in CELL_DCH (e.g., Time-To-Trigger) described in 3GPP TS 25.304 is that the latter two timers apply to new detected cell candidates that have better received signal quality. In other words, if a UE is in a serving cell (regardless of how long it has been there) and a new candidate serving cell having a better received signal is detected, the UE waits for a certain period to see whether the new candidate is stable before reselecting or event-triggering. The timer described in this application is applied only to the current MBMS serving cell after that cell is selected and irrespective of whether a "better" candidate cell is detected. If the conventional Treselection/Time-To-Trigger timers were used instead of the timer described in this application, a UE would take an unnecessarily long time to choose a new candidate MBMS serving cell even if the UE is not reading an MCCH in the current cell (i.e., the UE has been in the current MBMS serving cell for a while and thus has already read the MCCH data).

The procedure described above can be modified to allow for the possibility that a new candidate MBMS serving cell having "significantly" better received-signal quality than the current MBMS serving cell is found even before the average MBMS serving cell change time has elapsed. For example, if the received-signal quality of the new candidate is at least a threshold amount better than the received-signal quality of the current MBMS serving cell, then new candidate is selected as the MBMS serving cell regardless of the time spent in the current MBMS serving cell. In principle, the threshold amount, call it "X dB", can be any value greater than 0 dB, for example, 3 dB. It will be appreciated that the threshold amount can occur either because the signal quality of the current MBMS serving cell has continued unchanged but a better signal has been detected or because the signal quality of the current MBMS serving cell has decreased to such a degree that another cell's signal is sufficiently better. This modification can be advantageous when the UE is in a fast-moving environment, as described in more detail below.

Figure 4:
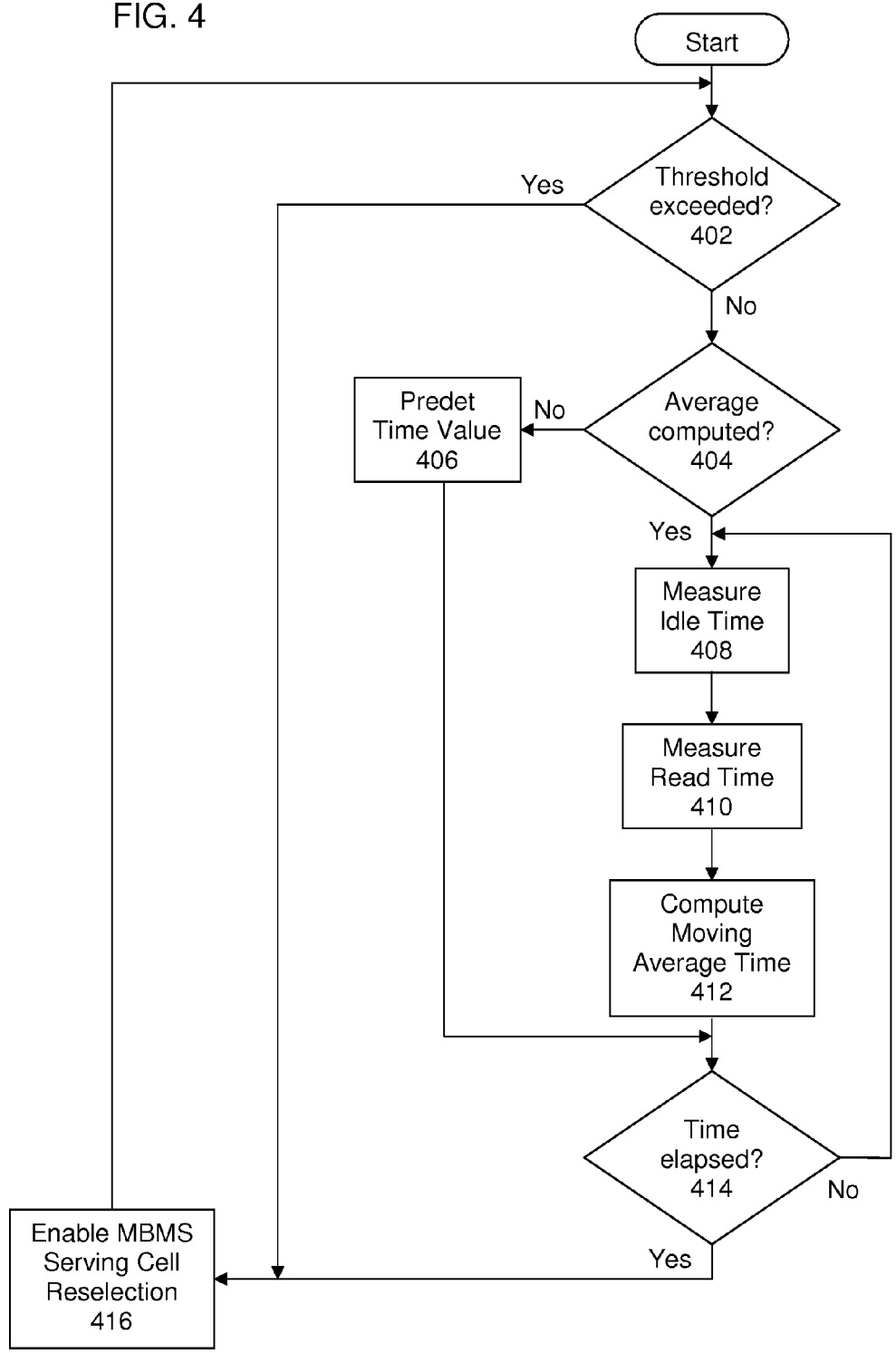
FIG. 4 is a flow chart of a method of determining an average MBMS serving cell change time.

FIG. 4 is a flow chart of an exemplary method of determining an average MBMS serving cell change time as described above. In step 402, the UE determines whether the signal quality difference threshold has been exceeded, and if not (No in step 402), the UE determines whether an average MBMS serving cell change time has been computed (step 404). If not (No in step 404), the UE retrieves a stored or otherwise predetermined change time value (step 406).

If an average MBMS serving cell change time has been computed (Yes in step 404), the UE proceeds to collect information needed for determining the average MBMS serving cell change time by measuring the idle time between information bursts on the MCCH (step 408) and measuring the time it needs to read the MCCH (step 410). For example, every time the UE reads the MCCH, the UE can measure the idle and read times and calculate averages. The idle time and read time parameters need not be constant, but are generally highly dependent on the amount of services an operator offers and so can vary over time. Based on the collected information, the UE computes a value of a moving average of the MBMS serving cell change time (step 412).

In step 414, the UE determines whether either the predetermined time value (step 406) or the moving average time value has elapsed. If not (No in step 414), the process flow returns to collecting information needed for determining the average MBMS serving cell change time. If the time has elapsed (Yes in step 414), the UE enables reselection (step 416) of the MBMS serving cell to proceed and the process flow returns to step 402. If the UE has determined that the signal quality difference threshold has been exceeded, reselection is also immediately enabled.

It will be understood that the timer can be allowed to expire (Yes in step 414) and enable cell reselection (step 416) at any time. This is also true for step 402, which is to say that, at any time, cell reselection is enabled if the signal received from another cell becomes X dB better than the signal received from the serving cell. Thus, the reader should not think that the UE can never enable cell reselection if the process flow is in steps 408 or 410 and perhaps due purely to the radio quality seems "stuck" in these steps.

In accordance with the method, a UE continues with a just-selected MBMS serving cell for an average MBMS cell change time before considering selecting another MBMS serving cell, unless either the quality of the current cell suddenly drops so that no reception can be performed in the current MBMS serving cell and another candidate cell with better quality exists or another candidate MBMS serving cell with significantly better quality exists even if the quality of current MBMS serving cell is sufficient. In the latter case, If the UE has just started the MBMS service/application and is not receiving user data (i.e., the MTCH) yet, the UE continues reading from the current MBMS serving cell. The rationale for this behavior is that the user is waiting, and so it is better to capture control data needed for receiving an MTCH, even though there exists a better candidate cell, because the user should not be made to wait unnecessarily. If user data (an MTCH) is already being received, the UE reselects to the new candidate immediately. The rationale for this behavior is that the user is already receiving user data, and so it is better to reselect the new candidate cell because the UE seems to be heading there anyway (i.e., that's why the quality of the new candidate cell is significantly better).

Using this invention, the UE can avoid ping-pong problems, such as unnecessary activities related to reading the MBMS control channel, and so the UE can save substantial power and also avoid unnecessary activities affecting processing load, resource conflicts, and the like. While an MBMS session is being received, a UE near a border between cells can manage to capture a complete set of MCCH data instead of just jumping between cells having more or less the same signal quality.

At startup of the MBMS service on cell borders (e.g., if the user just started the MBMS service), there is no unnecessary delay in reading the MCCH due to ping-pong before the MTCH can be received, and so the user gets a shorter startup time for the service. Compared to conventional Time-To-Trigger hysteresis described above in a fast-moving environment (e.g., a high-speed train), instead of holding on to a cell the train has already passed, the UE ignores the time hysteresis when the quality of a new candidate cell is much higher than current cell.

At each UE, a received modulated radio carrier signal (Layer 1) is processed to produce an estimate of the original information data stream intended for the receiver. The composite received baseband spread signal is commonly provided to a "rake" combiner having a number of "fingers", or de-spreaders, that are each assigned to respective ones of selected components, such as multipath echoes or streams from different NodeBs, in the received signal. Each finger combines a received component with a scrambling sequence and appropriate channelization code so as to de-spread the received composite signal. The rake combiner typically de-spreads both sent information data and pilot or training symbols that are included in the composite signal.

Figure 5:
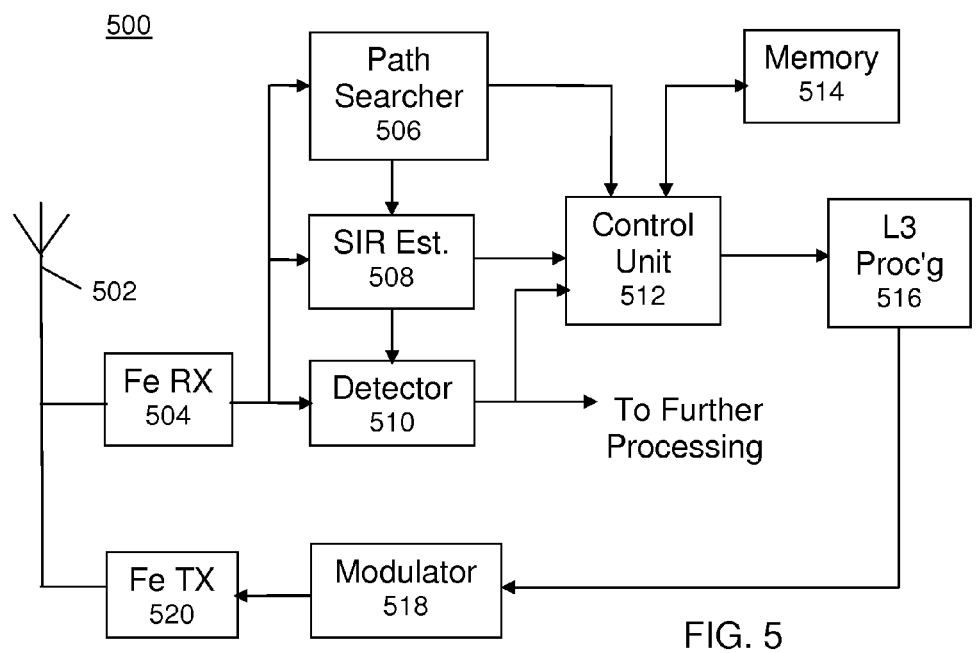
FIG. 5 is a block diagram of a user equipment that determines an average MBMS serving cell change time.

FIG. 5 is a block diagram of a portion of a UE 500 that is suitable for determining and using an average MBMS serving cell change time as described above. For simplicity, only some parts of the UE 500 are shown in the figure. Signals transmitted by NodeBs are received through an antenna 502 and down-converted to base-band signals by a front-end receiver (Fe RX) 504. On a regular basis for all detected cells, a received signal code power (RSCP) is estimated and a received signal strength indicator (RSSI) is computed by a path searcher 506 in a manner known in the art. An RSCP can be estimated by, for example, de-spreading the base-band signal from a detected cell with the scrambling code (and pilot channel channelization code) corresponding to the cell. In suitable communication systems, for example, the RSSI can be estimated by computing the variance of the received signal over a given time period, such as one time slot (e.g., 0.67 milliseconds).

Information from the path searcher 506 is provided to a signal-to-interference ratio (SIR) estimator 508 that estimates the signal level S and interference level I for all fingers, or paths, for all detected cells. In some systems, this may not be done for all detected cells but only for those detected cells that are included in the Active Set. The SIR estimates generated by the estimator 508 are provided to a detector 510, which uses the estimates in combining versions of the transmitted data and control symbols received along different paths and generating decoded symbols that are provided to further processing blocks in the UE 500.

The RSSI, RSCP, and SIR estimates are estimates of the received signal quality, and one or more of them, with the decoded symbols, are also provided to a control unit 512, such as a suitably programmed electronic processor, collection of logic gates, etc., which uses the estimates in determining an average MBMS serving cell change time based on the average idle period between MCCH information bursts and the average time needed by the UE to read an MCCH information burst and to read system broadcast information blocks necessary for MBMS operation as described above. As depicted in FIG. 5, the control unit 512 exchanges information, such as measurements of MCCH idle periods, with a memory 514.

Figure 1:
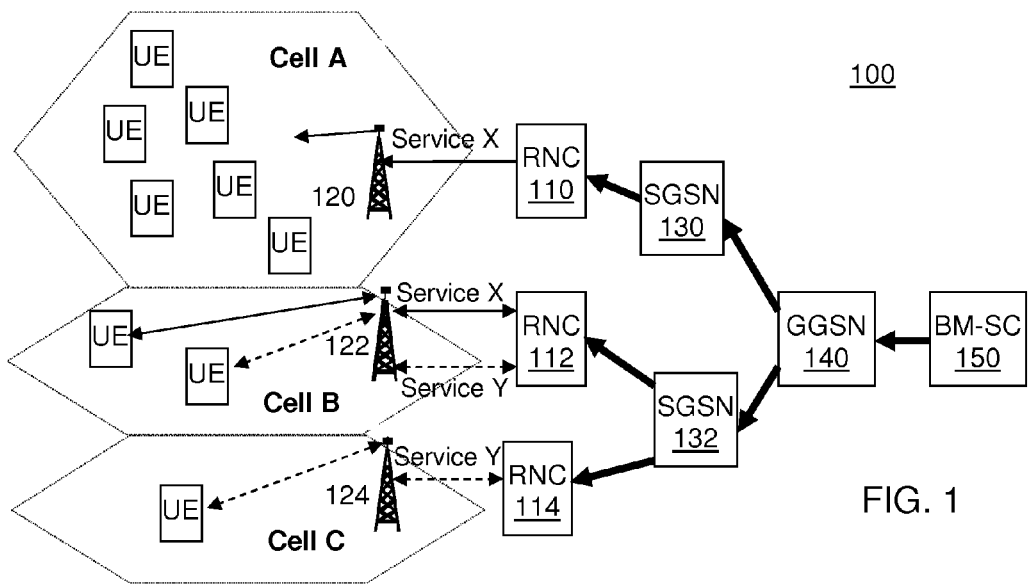
FIG. 1 depicts a telecommunication system.
Figure 2:
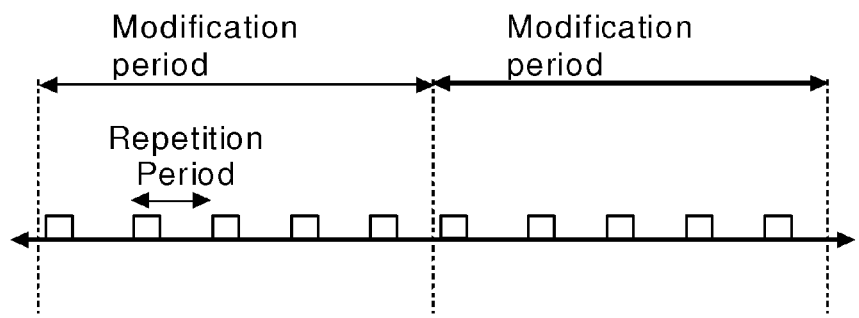
FIG. 2 depicts timing of a multicast control channel.

It will be understood that the UE can be implemented by other arrangements and combinations of the functional blocks shown in FIG. 5. In addition, it will be understood that the UE may simply report its measurements to another entity, such as a NodeB or RNC, depicted in FIG. 1, in the communication system rather than generating average MBMS serving cell change time values itself. For example, parameters computed by the control unit 512 can be included in suitable report messages, if desired, that can be produced by a Layer 3 (L3) processing component 516, provided to a suitable modulator 518, and transmitted to a NodeB via a front-end transmitter 520. A suitable processor in the NodeB or an RNC can then determine the values and send them to the UE. Nevertheless, it currently appears more advantageous to carry out these steps in the UE as doing so can avoid changes in the system specifications and increased control messaging.

It will be appreciated that procedures described above are carried out repetitively as necessary, for example, to respond to time-varying characteristics of communication channels between transmitters and a receiver. To facilitate understanding, many aspects of this invention are described in terms of sequences of actions that can be performed by, for example, elements of a programmable computer system. It will be recognized that various actions could be performed by specialized circuits (e.g., discrete logic gates interconnected to perform a specialized function or application-specific integrated circuits), by program instructions executed by one or more processors, or by a combination of both.

Moreover, this invention can additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions. As used here, a "computer-readable medium" can be any means that can contain, store, or transport the program for use by or in connection with the instruction-execution system, apparatus, or device. The computer-readable medium can be, for example but not limited to, an electronic, magnetic, optical, electromagnetic, infrared, or semiconductor system, apparatus, or device. More specific examples (a non-exhaustive list) of the computer-readable medium include an electrical connection having one or more wires, a portable computer diskette, a random-access memory (RAM), a read-only memory (ROM), an erasable programmable read-only memory (EPROM or Flash memory), and an optical fiber.

Thus, this invention may be embodied in many different forms, not all of which are described above, and all such forms are contemplated to be within the scope of the invention. For each of the various aspects of the invention, any such form may be referred to as "logic configured to" perform a described action, or alternatively as "logic that" performs a described action.

It is emphasized that the terms "comprises" and "comprising", when used in this application, specify the presence of stated features, integers, steps, or components and do not preclude the presence or addition of one or more other features, integers, steps, components, or groups thereof.

The particular embodiments described above are merely illustrative and should not be considered restrictive in any way. The scope of this invention is determined by the following claims, and all variations and equivalents that fall within the range of the claims are intended to be embraced therein.

What is claimed is:

1. A method in a mobile user equipment (UE) of determining an average time for changing a currently selected multimedia broadcast and multicast service (MBMS) serving cell, comprising: collecting information comprising measurement of an average idle period between multicast control channel (MCCH) information bursts and measurement of an average time needed by the UE to read MCCH information, wherein the MCCH information including a master information block and a plurality of system information blocks of different types, based on a signal received by the UE, that is needed for determining the average time for changing the UE's currently selected MBMS serving cell, wherein the average time is respective to an operator of the UE's currently selected MBMS serving cell, and collecting information includes determining a moving average time needed by the UE to read a complete set of control data of the UE's currently selected operator's MBMS serving cell; and based on the collected information, computing a value of the moving average time of the operator for changing the UE's currently selected MBMS serving cell; and if the moving average time has not yet been computed, retrieving a predetermined change time value; wherein cell reselection is enabled when a signal received from another cell becomes a threshold amount better in signal quality than a signal received from a serving cell and after the UE waits for a certain predetermined time hysteresis in CELL_DCH to see whether the new candidate is stable.

2. The method of claim 1, further comprising determining whether the moving average time value has elapsed, and if the moving average time value has elapsed, enabling reselection of the UE's currently selected MBMS serving cell or a new MBMS serving cell.

3. The method of claim 1, wherein if the signal quality difference threshold has been exceeded, enabling immediate reselection of a new MBMS serving cell.

4. An apparatus in a mobile user equipment (UE) for determining an average time for changing a currently selected multimedia broadcast and multicast service (MBMS) serving cell, comprising: a processor configured to collect information comprising measurement of an average idle period between multicast control channel (MCCH) information bursts and measurement of an average time needed by the UE to read MCCH information, wherein the MCCH information including a master information block and a plurality of system information blocks of different types, based on a signal received by the UE, that is needed for determining the average time for changing the UE's currently selected MBMS serving cell, wherein the average time is respective to an operator of the UE's currently selected MBMS serving cell, and the processor is configured to collect information by at least determining a moving average time needed by the UE to read a complete set of control data of the UE's currently selected operator's MBMS serving cell; a control unit configured to compute, based on the collected information, a value of the moving average time of the operator for changing the UE's currently selected MBMS serving cell; and the control unit further configured to retrieve, if the moving average time has not yet been computed, a predetermined change time value; wherein cell reselection is enabled when a signal received from another cell becomes a threshold amount better in signal quality than a signal received from a serving cell and after the UE waits for a certain predetermined time hysteresis in CELL_DCH to see whether the new candidate is stable.

5. The apparatus of claim 4, wherein the control unit is further configured to determine whether the moving average time value has elapsed, and if the moving average time value has elapsed, to enable reselection of the UE's currently selected MBMS serving cell or a new MBMS serving cell.

6. A non-transitory computer-readable medium encoded with a computer program for determining an average time for changing a currently selected multimedia broadcast and multicast service (MBMS) serving cell in a mobile user equipment (UE), wherein the computer program when executed causes the computer to perform a method comprising: collecting information comprising measurement of an average idle period between multicast control channel (MCCH) information bursts and measurement of an average time needed by the UE to read MCCH information, wherein the MCCH information including a master information block and a plurality of system information blocks of different types, based on a signal received by the UE, that is needed for determining the average time for changing the UE's currently selected MBMS serving cell, wherein the average time is respective to an operator of the UE's currently selected MBMS serving cell, and collecting information includes determining a moving average time needed by the UE to read a complete set of control data of the UE's currently selected operator's MBMS serving cell; based on the collected information, computing a value of the moving average time of the operator for changing the UE's currently selected MBMS serving cell; and if the moving average time has not yet been computed, retrieving a predetermined change time value; wherein cell reselection is enabled when a signal received from another cell becomes a threshold amount better in signal quality than a signal received from a serving cell and after the UE waits for a certain predetermined time hysteresis in CELL_DCH to see whether the new candidate is stable.

7. The non-transitory medium of claim 6, wherein the method further comprises determining whether the moving average time value has elapsed, and if the moving average time value has elapsed, enabling reselection of the UE's currently selected MBMS serving cell or a new MBMS serving cell.

* * * * *